(12) United States Patent
Nelson

(10) Patent No.: US 11,452,278 B1
(45) Date of Patent: Sep. 27, 2022

(54) DISPOSABLE PET PEE PAD SYSTEM AND METHOD OF USE

(71) Applicant: Jerry Dale Nelson, Arlington, TX (US)

(72) Inventor: Jerry Dale Nelson, Arlington, TX (US)

( * ) Notice: Subject to any disclaimer, the term of this patent is extended or adjusted under 35 U.S.C. 154(b) by 47 days.

(21) Appl. No.: 16/706,192

(22) Filed: Dec. 6, 2019

Related U.S. Application Data

(60) Provisional application No. 62/776,230, filed on Dec. 6, 2018.

(51) Int. Cl.
*A01K 1/015* (2006.01)
*A01K 1/01* (2006.01)

(52) U.S. Cl.
CPC .......... *A01K 1/0157* (2013.01); *A01K 1/0107* (2013.01)

(58) Field of Classification Search
CPC ............................ A01K 1/0107; A01K 1/0157
See application file for complete search history.

(56) References Cited

U.S. PATENT DOCUMENTS

| | | | | |
|---|---|---|---|---|
| 3,339,527 A * | 9/1967 | Burroughs | ........... | A01K 1/0107 119/169 |
| 3,626,900 A * | 12/1971 | Failla | ................... | A01K 1/0107 119/161 |
| 3,752,121 A * | 8/1973 | Brazzell | ............... | A01K 1/0107 119/169 |
| 5,085,174 A * | 2/1992 | Etkin | ....................... | A01K 1/04 119/169 |
| 8,127,717 B1 * | 3/2012 | Trodella | ............... | A01K 1/0107 119/161 |
| 8,225,748 B2 * | 7/2012 | Crawford | ............. | A01K 1/0107 119/161 |
| 9,445,575 B2 * | 9/2016 | Ferguson | ............. | A01K 1/0157 |
| 9,532,546 B1 * | 1/2017 | Klein, Jr. | ............. | A01K 1/0107 |
| 10,568,299 B2 * | 2/2020 | Miller | ..................... | B32B 27/12 |
| 2005/0263096 A1 * | 12/2005 | Mita | ..................... | A01K 15/024 119/706 |
| 2007/0179468 A1 * | 8/2007 | LaBelle | ............... | A01K 1/0107 604/385.19 |
| 2009/0286026 A1 * | 11/2009 | Lux-Bellus | ............ | A01K 1/035 428/85 |
| 2010/0326367 A1 * | 12/2010 | Wedertz | ............... | A01K 15/024 119/706 |
| 2014/0283752 A1 * | 9/2014 | Lowe | .................... | A01K 1/0107 119/161 |
| 2016/0309675 A1 * | 10/2016 | Barys | .................... | A01K 1/0107 |
| 2019/0343080 A1 * | 11/2019 | Chapman | ............. | A01K 23/005 |

(Continued)

FOREIGN PATENT DOCUMENTS

| | | | |
|---|---|---|---|
| CZ | 34305 U1 | * | 8/2020 |
| DE | 102016113915 A1 | * | 2/2018 |
| JP | 2006166795 A | * | 6/2006 |

(Continued)

*Primary Examiner* — Magdalena Topolski
(74) *Attorney, Agent, or Firm* — Leavitt Eldredge Law Firm

(57) ABSTRACT

A pet waste collection system includes a multi-layered pad configured to lay flat on a surface and having a top layer to be an absorbent layer; and a ground layer to be a leak-proof layer; a drawstring integrated into the ground layer; and pull tabs attached to the drawstring; a user may pull the plurality of pull tabs in an opposing direction causing the drawstring to tighten to collect pet waste within the multi-layered pad.

1 Claim, 4 Drawing Sheets

(56) References Cited

U.S. PATENT DOCUMENTS

2021/0169036 A1\* 6/2021 Rachel ................ A01K 1/0125

FOREIGN PATENT DOCUMENTS

| JP | 2007312713 | A | \* | 12/2007 |
| KR | 20130021539 | A | \* | 3/2013 |
| KR | 20130021539 | A | \* | 6/2013 |
| KR | 101304533 | B1 | \* | 9/2013 |
| KR | 20200095102 | A | \* | 8/2020 |

\* cited by examiner

DISPOSABLE PET PEE PAD SYSTEM AND METHOD OF USE

BACKGROUND

1. Field of the Invention

The present invention relates generally to a disposable pet pee pad system and methods of use. More specifically, the invention is related to a system and method to collect pet urine in a clean and disposable manner using a multi-layered pee collection pad and an integrated drawstring for disposability.

2. Description of Related Art

Systems and methods for pee collection apparatus are well known in the art. For example, many pet owners opt for litter style boxes, wherein a pet may urinate or otherwise go to the bathroom in a designated box that has odor absorbing pellets. In another example, many pet owners choose to house-train their pet so that the pet may learn to only relieve themselves outside or in an otherwise designated location.

One of the problems commonly associated with standard urine collection systems is the limited use. Litter boxes are not disposable themselves, and the filler pellets are cumbersome to dispose of. The pellets must be replaces often. Additionally, often accident still arise in the house when house training a pet to only go to the bathroom out of doors.

Although great strides have been made in the area of pet urine collection systems and methods of use, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
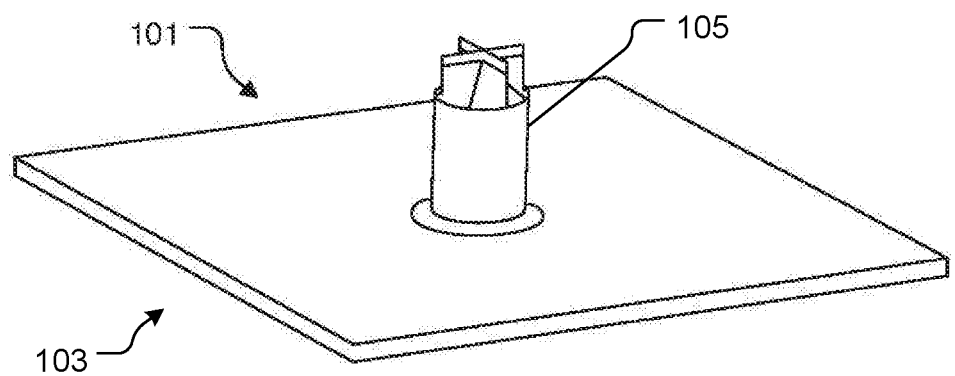
FIG. 1 is a simplified schematic of a system and method of the present invention in accordance with the preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods for pet urine collection devices. Specifically, the present invention is directed to a multi-layered urine collection pad that includes an integrated drawstring for disposability. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts a view of a system 101 and method of use in accordance with a preferred embodiment of the present application. It will be appreciated that system 101 overcomes one or more of the above-listed problems commonly associated with the conventional systems and methods to collect and dispose of pet urine and waste.

Referring now to FIG. 1, a simplified schematic of the system of the present invention is shown having a multi-layered pad 103 and a vertical capture device 105.

Figure 2:
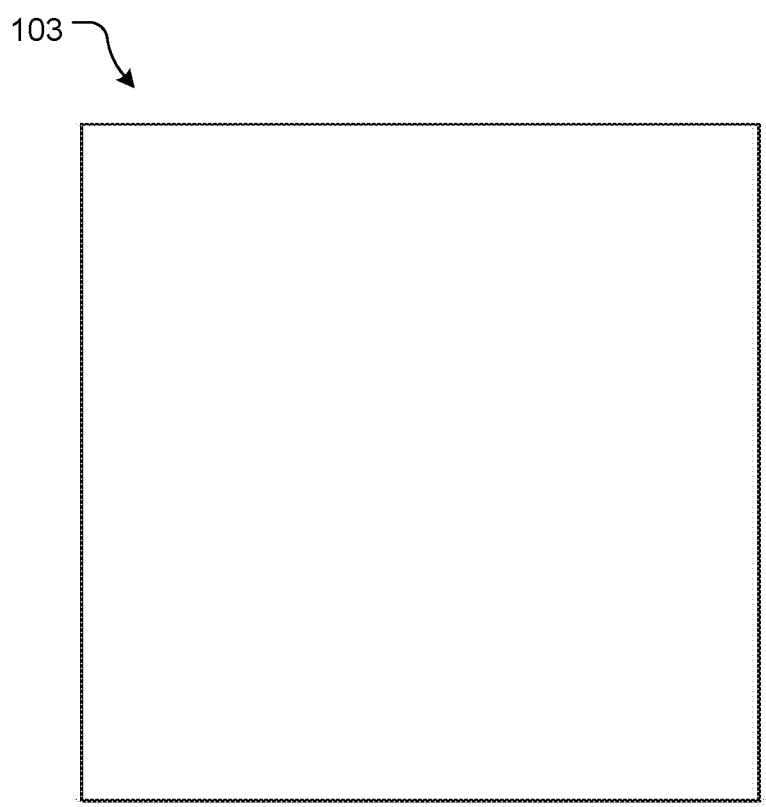
FIG. 2 is a top view of the pad of the system of FIG. 1.

Referring now to FIG. 2, a top view of the pad 103 is depicted as rectangular pad configured to lay flat on a surface. It should be appreciated that in some embodiments, the pad 103 can vary in shapes and sizes.

Figure 3:
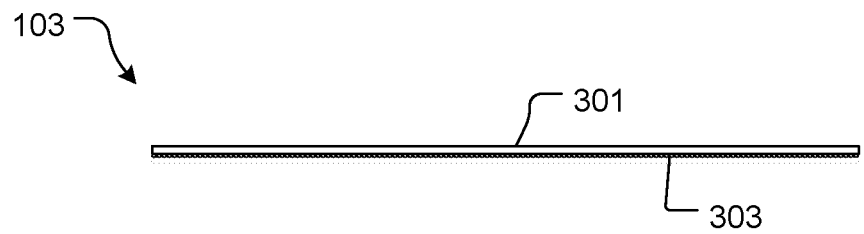
FIG. 3 is a side view of the pad of the system of FIG. 1.

Referring now to FIG. 3, a side view of the pad 103 is shown having at least two layers, a top layer 301 and a ground layer 303 wherein the top layer is configured to be absorbent and odor-locking and wherein the ground layer 303 is configured to be leak-proof such that the urine collected by the top layer 301 does not leak through the ground layer 303 onto the surface upon which it is placed.

Figure 4:
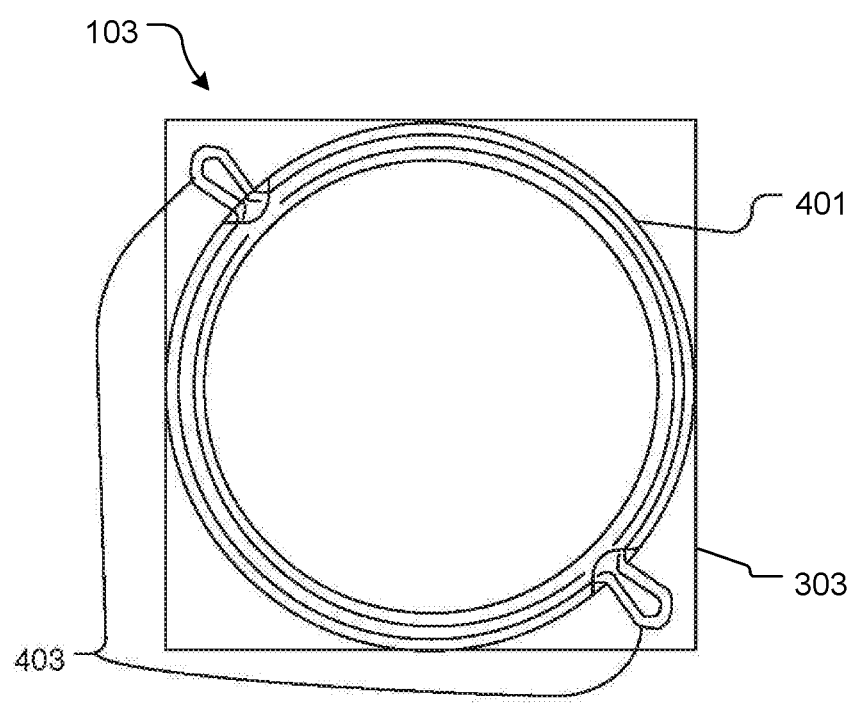
FIG. 4 is a bottom view of the pad of the system of FIG. 1.

Referring now to FIG. 4, a bottom view of the pad 103 is shown depicting the bottom side of the ground layer 303 having an integrated drawstring 401 which is woven into the ground layer 303. The drawstring 401 forms circular loops that are drawn together using the two pull tabs 403 connected to the drawstring 401 at opposing sides. It should be appreciated that although the drawstring is shown in a circular formation, other formations could be used. When a user desires to dispose of the pad, he or she may simultaneously pull the pull tabs 403, 405 in opposite directions to tighten and draw together the circular loops of the drawstring 401. This allows the user to collect all the urine and waste within a bag-shape formed by the leak-proof ground layer 303 of the pad 103.

Figure 5:
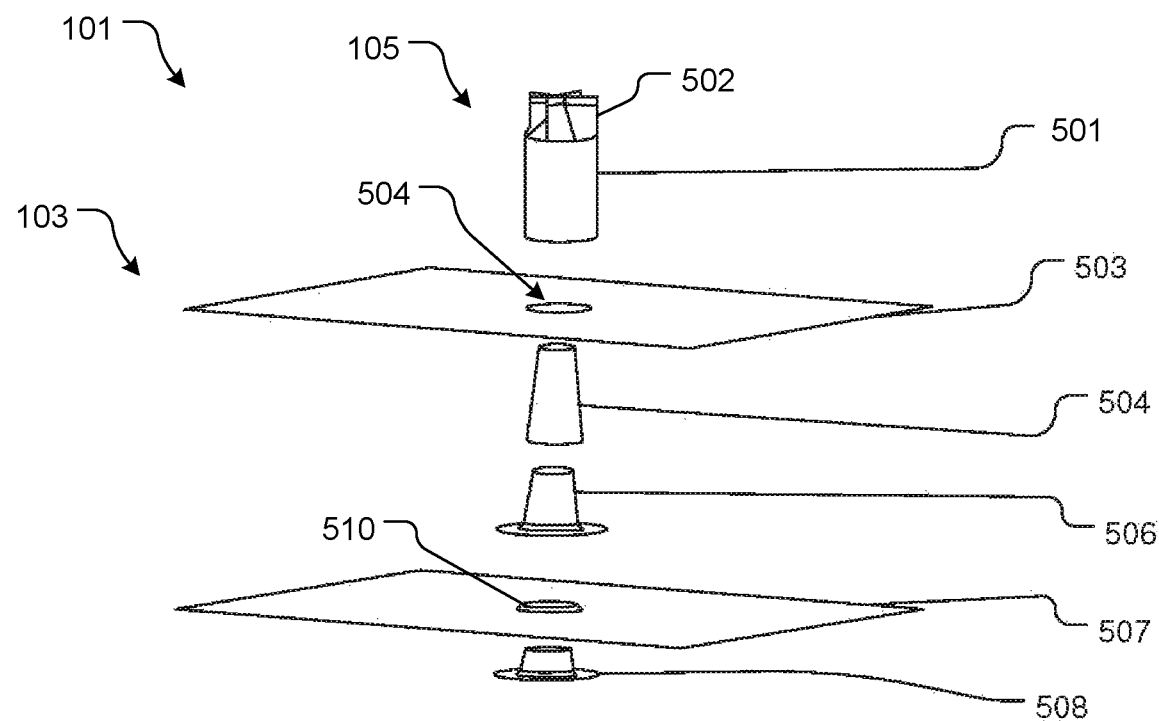
FIG. 5 is a first expanded view of the system of FIG. 1.
Figure 6:
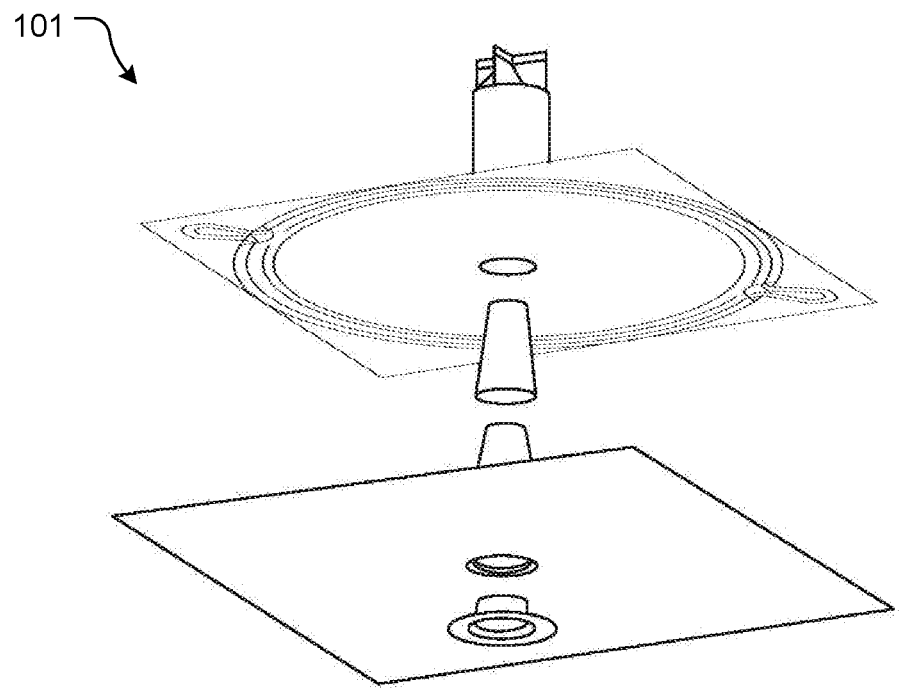
FIG. 6 is a second expanded view of the system of FIG. 1.

Referring now to FIGS. 5 and 6, expanded views of the system of FIG. 1, are shown having a multi-layered pad 103 and a vertical capture device 105. The vertical capture device 105 comprises a vertical outer cylinder 501 having extended flaps 502, a rigid core cup 504 to support the vertical outer cylinder 501 and keep the capture device from collapsing or being knocked over. A locking hub 506 located between the rigid core cup 504 and the ground layer 507 is shown as the device that completes the seal between the upper components. The ground layer 507 is shown having a ground layer connection 510. Underneath the ground layer 303, a base connecting puck 508 is shown. The base connecting puck 508 acts the base of the vertical capture device 105 and may be tension fitted to the above layers. The multi-layered pad 103 is comprised of a top layer 503 and ground layer 507. As shown, the multi-layered pad includes opening 504 to provide for securing of the vertical capture device and the multi-layered pad.

The system 101 is shown from an alternative angle in FIG. 6.

The vertical capture device 105 may be configured for use by male pets such as dogs who lift one leg to urinate. It is contemplated that the vertical capture device 105 may be used separately or in conjunction with the multi-layered pad 103. Alternatively, it is contemplated that the multi-layered pad 103 may be used separately or in conjunction with the vertical capture device 105.

In a further contemplated embodiment, the multi-layered pad 103 may be comprised of more than two layers to facilitate adding leak-proof and odor-locking capabilities. Additionally, it is contemplated that the system 101 may be configured to collect urination as well as solid waste from a pet.

Figure 7:
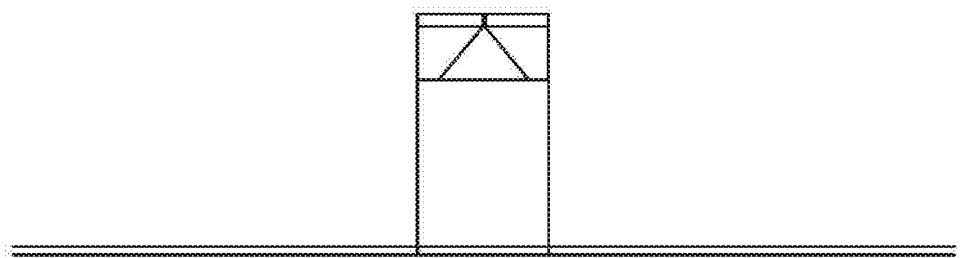
FIG. 7 is a side cross-sectional view of the system of FIG. 2.

In FIG. 7, a side view of system 101 is shown for clarity.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A pet waste collection system comprising:
   a multi-layered pad configured to lay flat on a surface and having:
      a top layer is an absorbent layer; and
      a ground layer is a leak-proof layer;
   a drawstring completely disposed within a thickness of the ground layer, the drawstring having a pull tab extending outside of the thickness of the ground layer; and
   a locking hub partially disposed between the ground layer and the top layer, the locking hub extends through the top layer;
   a cup secured directly to the locking hub; and
   a vertical cylinder secured on the cup and extending above the top layer, the vertical cylinder having a plurality of flaps, the vertical cylinder is configured to capture fluid;
   a base connecting puck disposed below the ground layer and directly attached to the locking hub through the ground layer, wherein the base connecting puck allows for the capture of waste from the cylinder
   wherein a user may pull the pull tab causing the drawstring to tighten to collect pet waste within the multi-layered pad; and
   wherein the ground layer is configured to completely enclose the vertical cylinder as the user pulls the drawstring.

* * * * *